UNITED STATES PATENT OFFICE.

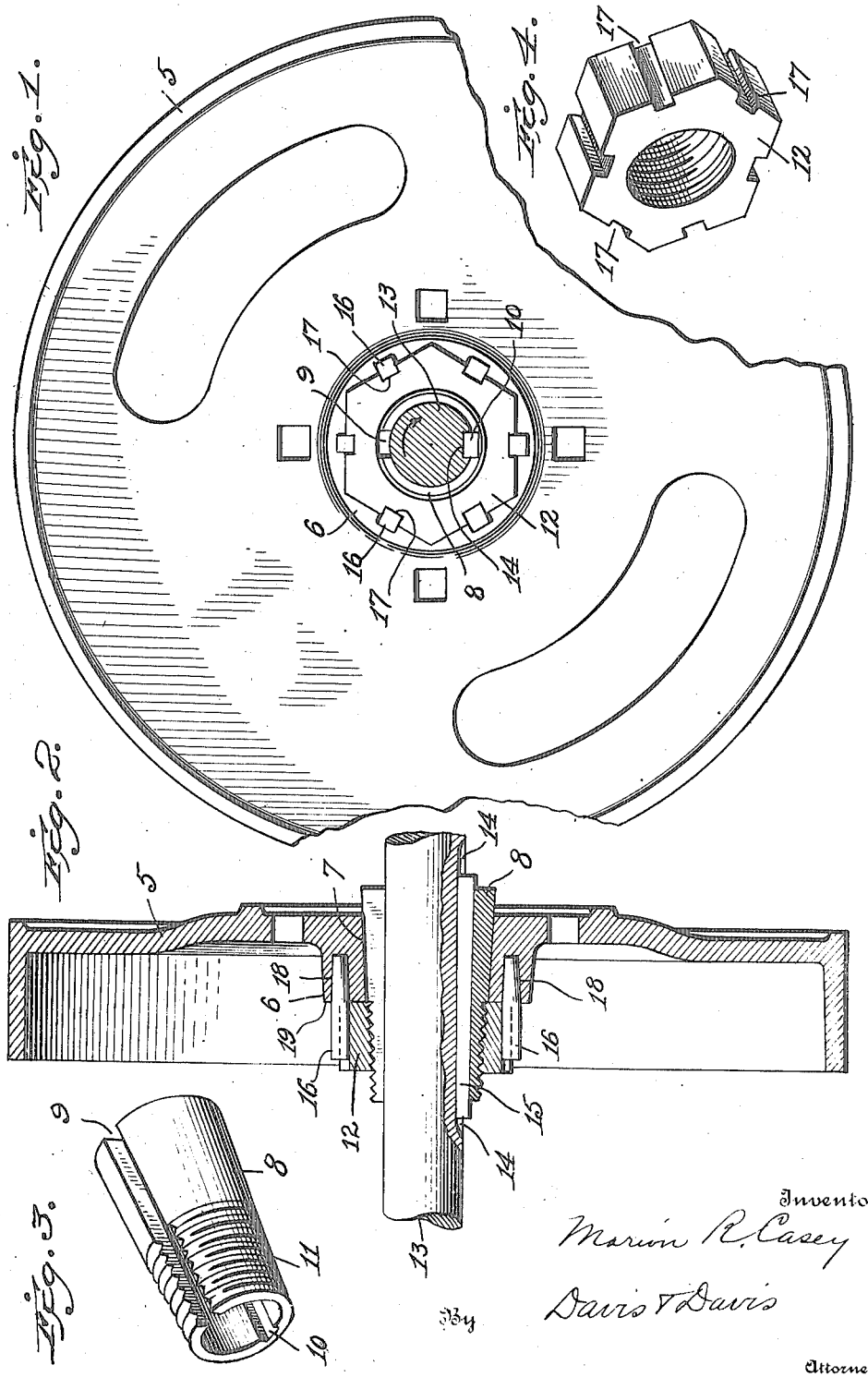

MARION R. CASEY, OF WARE SHOALS, SOUTH CAROLINA, ASSIGNOR TO MAMIE H. FLOWERS, OF ASHEVILLE, NORTH CAROLINA.

SELF-TIGHTENING GEAR AND PULLEY ATTACHMENT.

1,393,261.  Specification of Letters Patent.  Patented Oct. 11, 1921.

Application filed November 6, 1920.  Serial No. 422,272.

*To all whom it may concern:*

Be it known that I, MARION R. CASEY, a citizen of the United States of America, and a resident of Ware Shoals, county of Greenwood, and State of South Carolina, have invented certain new and useful Improvements in Self-Tightening Gear and Pulley Attachments, of which the following is a full and clear specification.

This invention relates to improvements in pulley bushings and has for its particular object to provide a means for mounting a pulley on a shaft which will automatically tighten its grip should the pulley or shaft work loose with relation to each other. The device is specially adapted for use with headgears for looms, which have heretofore caused considerable trouble by working loose during the operation of the loom and required manual operations to retighten them.

A further object is to provide a tapered contractible bushing with means for securing it in position in a manner to automatically draw it into tight engagement should the parts work loose.

These and other objects hereinafter set forth are attained by the means illustrated in the accompanying drawing, in which—

Figure 1 is a side elevation of a pulley showing one end of the bushing;

Fig. 2 is a vertical central section through the pulley showing the improved securing device in longitudinal section;

Fig. 3 is a perspective view of the improved bushing;

Fig. 4 is a detail view of the securing nut.

Similar reference numerals in all of the figures of the drawing designate like parts.

Referring to the drawing, 5 designates the pulley-wheel formed with a hub 6 which is provided with a tapered central opening 7 to receive a tapered bushing 8. This bushing or sleeve 8 is split longitudinally, as shown at 9, is formed with an internal keyway 10 (preferably located opposite the open slit in the bushing) and is also provided with an external screw-threaded portion 11 at its smaller end (as shown clearly in Fig. 3 of the drawing), said screw-threaded portion being adapted to receive a nut 12.

The pulley is adapted to be mounted upon a driving-shaft 13, and said shaft is provided with a key-way 14 to receive a tapered key 15 which also engages the key-way 10 in the bushing to secure the bushing upon the shaft against rotation. After the pulley and its bushing have been placed upon the shaft and the key 15 driven home in its key-ways 10 and 14, the nut 12 is then screwed into position on the threads 11 until it abuts against the face of the hub, when a further tightening of the nut will draw the tapered bushing to the left into close engagement with the tapered opening 7 and clamping engagement with the shaft 10 and key 15.

After nut 12 has been screwed into place, it is secured against independent rotation by pins 16 engaging grooves 17 and openings 18 formed in the hub 6 parallel to the shaft.

In operation, assuming that the shaft is being driven to the right, as indicated by the arrow in Fig. 1, the bushing 8 will be carried around in the same direction by the key 15; the bushing being drawn into tight engagement with the hub of the pulley will drive the same freely in the same direction when no resistance is offered to the pulley. When the pulley is used to drive other mechanism by a belt engaging its periphery or otherwise, however, the resistance of the parts to be driven tends to overcome the power of the shaft, the consequence being that the speed of the pulley has a tendency to be retarded with respect to the speed of the shaft, and, as the nut is held stationary to the pulley by the pins 16 and the bushing 8 is held keyed to the shaft, it is perfectly obvious that, should there be any looseness whatever between the engaging parts of the pulley, the bushing and the shaft, it will be automatically taken up either by the shaft screwing the bushing into the nut or the pulley screwing the nut on the bushing, both operations of which will draw the contractible bushing further into the tapered opening 7 and consequently into closer contact with the same and the shaft. Thus it will be observed that an automatic tightening means is provided for the pulley which is simple in construction and effective in operation.

This improved bushing-attaching means is further advantageous in that it can be applied to old pulleys and gears with a minimum of alterations. The type of head-gear or pulley now used for looms usually is constructed with extended hubs and is secured to the shaft with a plurality of set-screws in each hub and the usual type of shaft-key. Through constant strains, the securing parts work loose and oftentimes the hubs break or split on the line of the set-screw apertures, thus requiring reinforcing bands to be placed thereon in order to continue the use of the pulley.

To adapt the improved bushing to an old worn pulley, the hub is cut off a considerable distance to form the face 19, the central opening is reamed out to fit the tapered bushing, and openings 18 are drilled around the hub to register with the key-way in the nut 12. With these alterations, the improved bushing can be attached to an old pulley or gear at a minimum of expense. Ordinarily the old worn pulleys are thrown away if a new one is readily obtainable, but with the improved device an old worn pulley can be made equally as good and will last longer than a new one as usually used.

The nature and scope of the invention having been thus indicated and its preferred embodiment having been specifically described, what is claimed as new is:

1. A wheel having a hub and a tapered central opening, a bushing provided with a tapered exterior and split longitudinally, said bushing being capable of rotation in said opening, a nut for threaded engagement with the small end of said bushing and adapted to engage the face of said hub, means for securing said bushing against rotation on a shaft, and means for securing said nut to said hub.

2. A wheel having a hub and a tapered centrol opening, a bushing provided with a tapered exterior and split longitudinally and having internal key-way, said bushing being capable of rotation in said opening, a nut for threaded engagement with the small end of said bushing and adapted to engage the face of said hub, a key for engagement in said key-way and a corresponding key-way in a shaft to secure the bushing against rotation on the shaft, and means for securing said nut to the wheel.

3. A wheel having a hub and a tapered central opening, a bushing provided with a tapered exterior and split longitudinally, said bushing being capable of rotation in said opening, a nut provided with key-ways on its exterior face and adapted for threaded engagement with the small end of said bushing and also adapted to engage the face of said hub, means for securing said bushing against rotation on a shaft, and pins for engagement in the grooves in said nut and openings in the hub to retain the nut against independent rotation with respect to the hub and wheel.

4. The combination with a shaft and a wheel, of a bushing for securing said wheel upon said shaft, said bushing being capable of rotation in the hub of said wheel and also being exteriorly tapered and mounted slidably with respect to the shaft and wheel and constructed for attachment to the shaft against independent rotation relative thereto, and a nut for securing the bushing in position and means for securing it against rotation independent of the wheel.

In testimony whereof I hereunto affix my signature.

MARION R. CASEY.